March 10, 1942.    H. W. BROADY    2,275,725
CONTINUOUSLY VARIABLE TRANSMISSION DEVICE
Filed June 12, 1940    2 Sheets-Sheet 1

INVENTOR.
Harry William Broady

March 10, 1942.    H. W. BROADY    2,275,725
CONTINUOUSLY VARIABLE TRANSMISSION DEVICE
Filed June 12, 1940    2 Sheets-Sheet 2
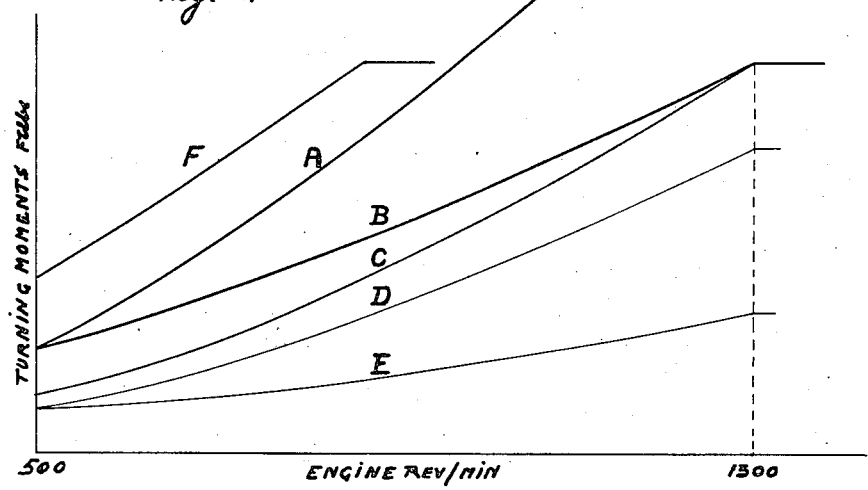
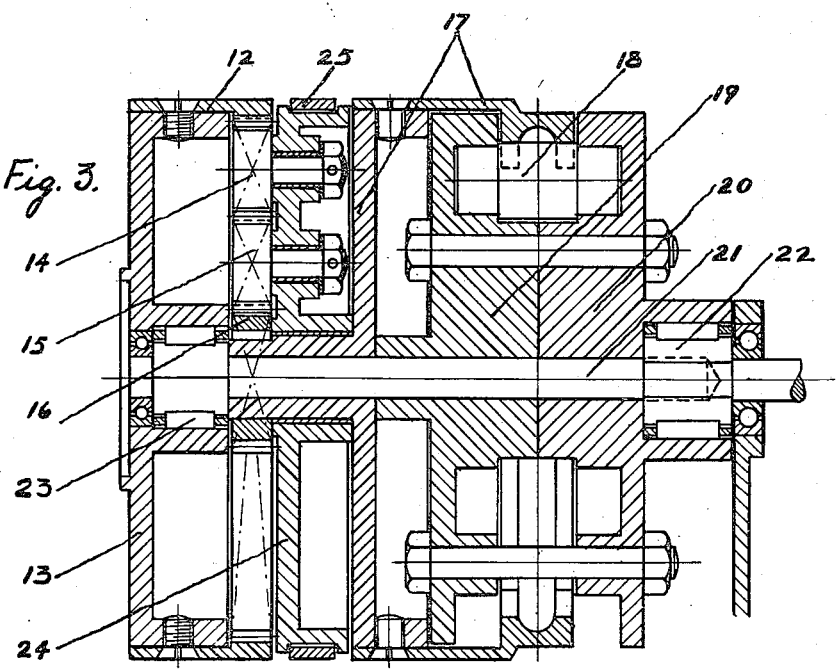
INVENTOR.
Harry William Broady Patented Mar. 10, 1942

2,275,725

UNITED STATES PATENT OFFICE 2,275,725

CONTINUOUSLY VARIABLE TRANSMISSION DEVICE

Harry William Broady, Pittsburgh, Pa.

Application June 12, 1940, Serial No. 340,013

7 Claims. (Cl. 74—64)

This invention relates to improvements in continuously variable transmission device working on a dynamic principle, having an endless chain of inertia weights rotating with a driving shaft and exerting a pressure on an eccentric member connected to a driven shaft.

One of the objects of this invention is to provide a power transmission which, when required, automatically varies its ratio to overcome a varying resistance or a change in the power so as to insure a continuous flow of power through the transmission.

Another object of this invention is to provide for such a transmission as the above with a second automatically variable ratio having its maximum at the start of the power flow thereby increasing the transmitting of power and also the fuel economy.

Figure 1:
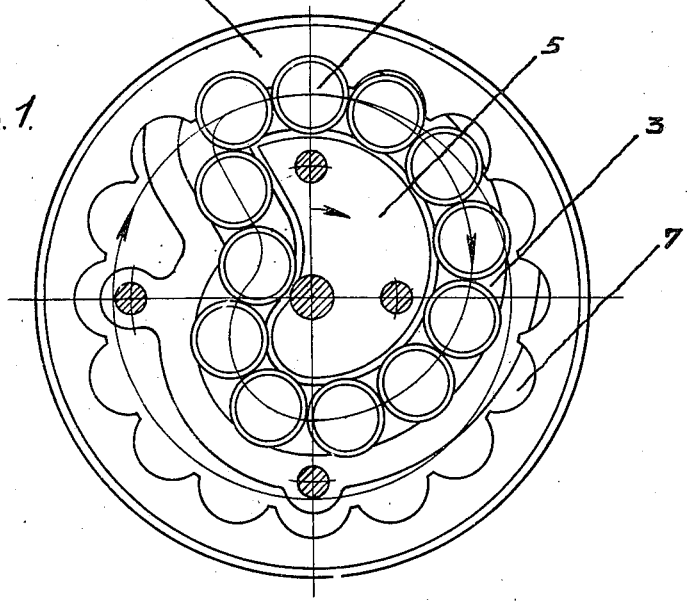
Figure 2:
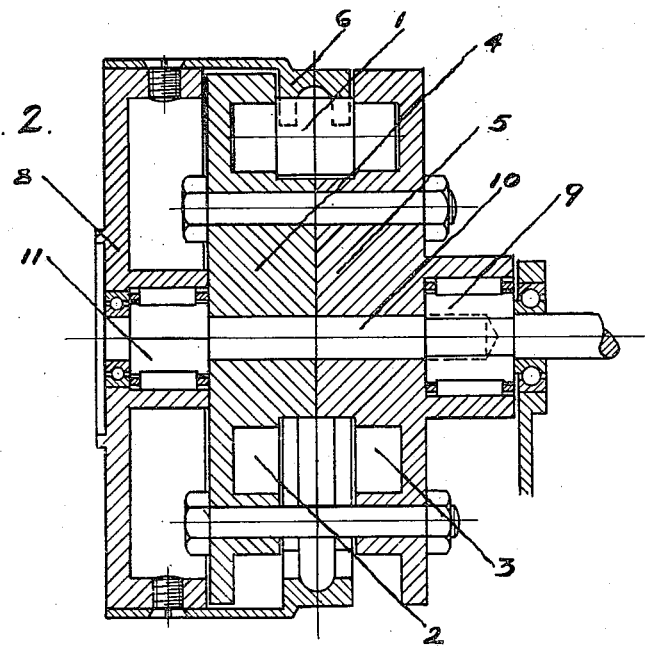

This invention in its preferred form is illustrated in the accompanying drawings in which Figure 1 is a plan view of the transmission as it looks with the flywheel removed; Figure 2 is a vertical section of the entire transmission; Figure 3 is a vertical section of a transmission with a selective intensifying attachment; Figure 4 is a diagram showing the power flow in a transmission of this type in the form of the turning moments active on the driven member at various speeds of the driving shaft.

The inertia weights 1 in the shape of rollers move in the eccentric grooves 2 and 3 on the eccentric members 4 and 5 which are secured to each other and constitute the driven member. The number of weights guided by the eccentric grooves is such that they are in contact with each other and thus form an endless chain flexible and movable. They are moved by the driving member 6 which has notches 7 shaped to fit the rollers. The notches have their centers on a circle that coincides with the outermost part of the eccentric track of the endless chain. The member 6 is secured to the engine flywheel 8. The eccentric member 5 is provided with a one way driving clutch 9 that engages the intermediate shaft 10 when the power flows from the driving member through the inertia weights over to the driven member and from there through the driving clutch over to the intermediate shaft and the parts connected to the same and which are to be driven. When the power flow reverses itself in the said driven parts, the driving clutch 9 disengages and the oppositely working clutch 11 becomes engaged, thereby connecting the intermediate shaft with the flywheel. The power flow will then be reversed in its direction and will tend to drive the engine, thereby forcing the same to act as a brake.

In Figure 3 activating member 12 is a gear secured to flywheel 13 and engaging intermediate gear 14 which engages the second intermediate gear 15 which engages gear 16 secured to driving member 17 and which latter moves inertia weights 18 along grooves on members 19 and 20 constituting the driven member. The latter is connected to shaft 21 through one way clutch 22, said shaft being also connected to the flywheel through one way clutch 23 acting in opposite direction to 22. Intermediate gears 14 and 15 are secured to free running brake drum 24 which may be held rigid with brake 25.

There are three periods in the operation of this transmission: the idling period with the driven member at rest, the ratio period with said member revolving at a lower speed than the driving member, and direct drive with both members revolving at the same speed. In Figure 4 A shows for different speeds of the driving member the turning moments in ft.-lbs. active on the driven member when the idling period ends and the ratio period starts. B shows said moments during a complete ratio period from the start to direct drive. C shows said moments at direct drive with different speeds. D shows said moments at the start of ratio periods, during the same, and at direct drive, when the weights are of the semi-free or link types and always having the same angular velocity as the driving member. E shows the moments for an externally eccentric type transmission, and F shows the same at the start of ratio periods in a transmission with intensifying arrangement as shown in Figure 3.

The two opposing grooves on the driven member have, as shown in Figure 1, each three sections: the outer sectoral section where the individual weights come into contact with and are moved by the driving member, the eccentric section where they are moved during both the idling and the ratio periods towards the center of the driven member, and the radial section where they are free to move from their innermost position out to the sectoral section.

The inertia weights in the rotating endless chain exert through their centrifugal forces a pressure on the outer surface of the eccentric section of the groove and as the verticals from said surface do not pass through the center of the driven member a turning moment active on said member is created by said pressure. The magnitude of this turning moment depends on the size of the above mentioned centrifugal forces which in their turn depend, outside of constructional details, to a great extent on the speed of the weights, i. e., their angular velocity.

There are two forces in the transmission counteracting each other; one is the incoming power flow through the driving member and the inertia weights; the other force is the resistance or load coming from the driven parts and intermediate shaft through the driving clutch to the driven member and its eccentric grooves where it is met by the power flow in the form of a turning moment. If the power flow and its turning moment is great enough to overcome the load, the driven member and the parts connected to the same will turn with an increasing speed until the power flow and the load balance each other and equilibrium between the two is established. The ratio between the speed of the driving member and the engine and that of the driven member will correspond to the relative sizes of the two opposing forces. Any change in the power flow or in the load starts a changing of said ratio to one corresponding to the new relation between the two forces. When the power flow is great enough to overcome the load to such an extent that the driven member attains the same speed as the driving member, the self-adjusting ratio has automatically decreased to equality 1:1 which in an automobile is called direct drive. This automatically variable ratio of equilibrium may therefore be called the self-adjusting ratio.

Under certain conditions the load turns into a driving force stronger than the power flow from the driving member. Such a condition is prevailing in an automobile going down-hill with the engine acting as a brake. With this reversed power inflow the driving clutch becomes disengaged and the brake clutch becomes engaged. The intermediate shaft and the parts connected to the same are then in direct contact with the engine which will act as a motor brake.

The continuously variable transmissions of the dynamic type have so far been found lacking in one very important respect. The amount of power transmitted through such a transmission depends on the rotating speed of the engine and the inertia weights or inertia bodies, these latter being in some constructions in liquid form. The dynamic effect of the inertia weights is proportional to the square of the speed and therefore comparatively small at low speeds. The starting of the power transmission through the overcoming of the load together with the following acceleration requires generally a considerable power inflow and the engine and the weights must be run at high speeds. In an automobile such a high starting speed of the engine will produce severe and extremely annoying vibrations and also strain and wear on the moving parts. In addition to this it will give a very poor fuel economy. It has with some constructions been found necessary to retain the conventional gear transmission in addition to the continuously variable transmission so as to insure a rapid start and acceleration through manually operated gear shifts introducing additional ratio into the transmitting of power. The continuously variable transmission becomes then an arrangement for high speeds or when a slow start and acceleration is desired.

This invention with its endless chain of free inertia weights has overcome this severe drawback. The weights are not restricted in their movements by connection securing them to the driving member. Such connections would divert a part of the centrifugal force and reduce the angular velocity of the weights in their active positions, thereby reducing the power flow and the efficiency of the transmission. The weights in this invention are during the idling and the ratio periods free to move along the groove and in contact with each other. When the weights pass the eccentric section and its incline towards the center of the driven member their angular velocity is increased more and more the nearer they come to said center. The centrifugal forces and their turning moments in this section are thereby increased giving a much higher effect and a greatly increased power flow.

When the weights pass the incline of the eccentric section their radial movement towards the center is in opposite direction to their centrifugal forces. It will therefore require an effort to hold and to move them along this incline and which effort will be greatly increased by the weights being free and in contact with each other whereby the effort for each weight must be strong enough to hold and to move both the weight and those preceding it until the latter reach the radial section and their outward movement starts. The effort comes from the driving member through the intervening weights. The directions of the effort from the nearest following weight and of the resistance from the nearest preceding weight are both such that there is from each weight in the eccentric section an extra pressure active on the driven member giving additional turning moments and increased power flow.

The above two increases in the turning moments and in the flow of power have their maximum at the start of the ratio period, which is where it is most needed and most effective. Both of them decrease with a decreasing ratio, i. e., with an increasing speed of the driven member relatively to that of the driving member, until direct drive is attained when both members have the same speed. The magnitude of the two increases combined is shown in Figure 4 where A represents the starting moments, B the moments during an accelerating ratio period, and C the moments at direct drive, all three at different speeds of the driving member. D shows the moments both at the start, during the ratio periods, and at direct drive, with semi-free or linked weights which are forced to move all the time with the same angular velocity as the driving member and have no preceding weights to hold and to move. With such weights there will be no increase of the moments neither at the start nor during ratio periods. Link weights may be considered inferior of the two having part of the centrifugal force diverted through the link. The externally eccentric type, represented by E, has a still lower efficiency. This latter type may be considered as the pioneer inertia weight transmission and is therefore included herewith.

The difference between the curves A and C may be called a super power-ratio as it shows the power increasing effect of the free weights at its maximum, i. e., at the starting of the driven member. B shows the effect of the said super power-ratio during a ratio period with an accelerating speed of the driving member. It also shows how it is decreasing with a decreasing ratio between the speed of the driving member and that of the driven member until said power-ratio comes to an end when direct drive starts. The transmission with semi-free weights in slots shows no noticeable increase neither at the start nor during the whole ratio period. The turning moments are at a constant engine speed practically the same from start to direct drive as is shown by D in Figure 4. There is in this latter case no increased angular velocity and only a very small and insignificant effect by the effort on the moving weights.

At direct drive the weights, the driving member, and the driven member have all the same angular velocity and there is no relative movement between them. A sudden increase in the load may be of such a magnitude that it starts a ratio period even at a high engine speed. The transmission will then act as in a reversed ratio period. The turning moments will increase rapidly with an increase in the ratio until the latter corresponds to the relation between power and load. From there it will act as a regular ratio period with a decreasing ratio until direct drive is once more established. The speed of the transmission may then have become another than before the temporary ratio period depending upon the new relationship between power and load. The super power-ratio will of course be effective even under this temporary ratio period and hasten the return to direct drive. This will greatly improve the effect of the transmission and give a more even flow of power and less vibrations. The higher the speed of the direct drive is at the start of such a temporary ratio period the greater are the turning moments during said period and the less ratio will be required for affecting the return to direct drive.

The main object of this invention is to increase the power flow especially at the start and it has been shown how this has been accomplished by means of the endless chain of free inertia weights and the super power-ratio. This increase is automatic in its action and is with its fixedly variable character limited within its scope. It has therefore in this invention been still further increased, when such an increase is desired, by a selectively operated intensifier. When the brake 25 in Figure 3 is not applied the brake drum 24 with its two gears will move and force the driving member 17 to move, all with the same speed as the activating member 12 and the engine to which it is secured. There is then no intensifying of power flow over what the endless chain and the super power-ratio gives. When the brake is applied the drum stops moving and the two intermediate gears go into action turning the driving member at a speed corresponding to the ratio between the activating member and the gear 16. The speed of the driving member and the power flow may thus be increased at will either momentarily or for longer periods. With a gear ratio over 1 less engine speed is required with an intensifier than without the same to get the same turning moments in both cases. With a gear ratio less than 1 a higher speed is required to accomplish the above. The turning moments are in reverse proportion to the square of the gear ratio. Thus with an intensifier having a gear ratio of 1.5:1 the required engine speed is only about 44 per cent of the same without an intensifier for equal turning moments. This accounts for the effectiveness of the intensifier and its quick response both at the start and for increased acceleration and power flow. It may be used whenever required, either at the start, during the ratio period, or at direct drive. It will be of great help in many emergency cases, as when the car is in a mudhole or a ditch. It will reduce vibration and noises on account of requiring less engine speed especially at the start. It will thereby also reduce the fuel consumption.

The driving member has, outside of its weight moving function, another function, namely to correct the position of the weights relatively to the eccentric surfaces on which they exert their pressure. The form they are given, as shown in Figures 1 and 2, together with the shape of the notches in the driving member insures any required adjustment at the driving points. A second adjustment can be arranged for by means of a notched gear connected to the driving member and acting on the weights in their innermost position.

Another important feature of this invention is the insignificant radial movement of the center of gravity of the rotating endless chain. The balancing of the offset weight of the chain is therefore easily accomplished, thereby reducing the vibrations.

The invention is not restricted to the form of constructions described herein, the principle of the invention may be carried out by other means without losing its character of an invention.

Having described my invention, I claim:

1. A continuously variable transmission having a driving member, a driven member provided with a closed groove, and an endless chain of loose inertia weights movable in said groove and guided by the same, said groove having a sectoral section where the weights come into contact with the driving member and are moved by the same, a section inclined towards the center of the driven member in such a way that the pressure from the weights on the outer wall of the last mentioned section, due to the centrifugal force, is in its direction offset relatively to the above center thereby creating a tortional moment which, when strong enough to overcome the resistance in the driven member, moves the latter whereby power flows from the driving member to said member and the parts connected to the same, and a section where the weights are free to move from their innermost to their outermost position closing the endless chain of loose weights.

2. A continuously variable transmission having a driving member, a driven member provided with a closed groove, and an endless chain of free inertia weights movable in said groove and guided by the same, the groove having a sectoral section where the weights come into contact with the driving member and are moved by the same, a section inclined towards the center of the driven member in such a way that the weights move in this section at an accelerating angular velocity and that the pressure from the weights on the outer wall, due to the centrifugal force, is in its direction offset relatively to said center thereby creating a tortional moment which, when strong enough to overcome the resistance in the driven member, rotates the latter whereby power flows from the driving member to the driven member, said tortional moment being greater during the ratio period, when there is a relative movement between the weights and the driven member, than at direct drive, when there is no such relative movement, the speed of the driving member being in both bases the same, the groove having another section where the weights are free to move from their innermost to their outermost position thereby closing the endless chain of free inertia weights.

3. A continuously variable transmission having a driving member, a driven member provided with a closed groove, and an endless chain of free inertia weights movable in said groove and guided by the same, said groove having a sectoral section where the weights come into contact with the driving member arranged to move the weights and when they are out of alignment, rectify their position relatively both to the groove and to each other, a section inclined towards the center of the driven member in such a way that the pressure from the weights on the outer wall of the section, due to the centrifugal force, is in its direction offset relatively to the above center thereby creating a tortional moment which, when strong enough to overcome the resistance in the driven member, moves the latter whereby power flows from the driving member to the driven member and the parts connected to the same and which are to be driven by the transmission, said tortional moment producing a super power-ratio when the speed of the driven member is less than that of the driving member, the groove having another section where the weights are free to move from their innermost to their outermost position thereby closing the endless chain of free inertia weights.

4. A continuously variable transmission having a driving member, a driven member provided with a closed groove, and an endless chain of inertia weights with fixed distances between their center of gravity and movable in said groove and guided by the same, the groove having a sectoral section where the weights come into contact with the driving member and are moved by the same, a section inclined towards the center of the driven member in such a way that the pressure from the weights, due to the centrifugal force, on the outer wall of this last mentioned section is in its direction offset relatively to the above center thereby creating a tortional moment which, when strong enough to overcome the resistance in the driven member, moves the latter whereby power flows from the driving member to the driven member, the angular velocity of the weights and their corresponding tortional moments increasing, due to the fixed distances between their centers, the closer they are moved towards the center of the driven member; and a section where the weights, when moving along the same, move from their innermost to their outermost position thereby closing the endless chain of inertia weights.

5. A continuously variable transmission having a driving member, a driven member provided with a closed groove, and an endless chain of inertia weights in contact with each other movable in said groove and guided by the same, the groove having a sectoral section where the weights come into contact with the driving member and are moved by the same, a section inclined towards the center of the driven member in such a way that the pressure from the weights, due to the centrifugal force and to the pressure on each weight from both the preceding and the following weight, on the outer wall of this last mentioned section is in its direction offset relatively to the above center thereby creating a tortional moment which, when strong enough to overcome the resistance in the driven member, moves the latter whereby power flows from the driving member to the driven member; and a section where the weights, when moving along the same, move from their innermost to their outermost position thereby closing the endless chain of inertia weights.

6. A continuously variable transmission having a driving member, a driven member provided with a closed groove, an endless chain of free inertia weights movable in said groove and guided by the same, and a selective arrangement for changing the magnitude of the power transmitted, the said groove having a sectoral section where the weights come into contact with the driving member and are moved by the same, a section inclined towards the center of the driven member in such a way that the pressure from the weights, due to the centrifugal force, on the outer wall of this last mentioned section is in its direction offset relatively to the above center thereby creating a tortional moment which, when strong enough to overcome the resistance in the driven member, moves the latter member whereby power flows from the driving member to the driven member; and a section where the weights, when moving along the same, move from their innermost to their outermost position thereby closing the endless chain of inertia weights; the above mentioned arrangement consisting of a selectively applicable mechanical device acting on the part of the transmission that governs one of the factors determining the tortional moment whereby the magnitude of the same and the power flow may be changed at will within the limits of the action of said device.

7. A continuously variable transmission having an activating member provided with a gear engaging one of two with each other engaged planet gears both secured to a brake drum, a driving member provided with a gear engaging the second planet gear, a driven member provided with a closed groove, an endless chain of free inertia weights movable in said groove and guided by the same, the said groove having a sectoral section where the weights come into contact with the driving member and are driven by the same, a section inclined towards the center of the driven member in such a way that the pressure from the weights, due to the centrifugal force, on the outer wall of this last mentioned section is in its direction offset relatively to the above center thereby creating a tortional moment which, when strong enough to overcome the resistance in the driven member, moves said member whereby power flows from the driving member to the driven member, the magnitude of this power flow changed at will within the limits of the above planet gear arrangement by retarding the brake drum thereby changing the speed factor of the tortional moment; and a section where the weights, when moving along the same, move from their innermost to their outermost position closing the endless chain of inertia weights.

HARRY WILLIAM BROADY.